United States Patent [19]

Kozawa

[11] 4,069,778

[45] Jan. 24, 1978

[54] NUMERICALLY CONTROLLED SEWING MACHINE

[75] Inventor: Tetsuo Kozawa, Toyoake, Japan

[73] Assignee: Brother Kogyo Kabushiki Kaisha, Nagoya, Japan

[21] Appl. No.: 685,701

[22] Filed: June 1, 1976

[51] Int. Cl.² ............................................. D05B 21/00
[52] U.S. Cl. ................................................ 112/121.12
[58] Field of Search ...................... 112/121.12, 121.11, 112/203; 250/560

[56] References Cited

U.S. PATENT DOCUMENTS

| | | | |
|---|---|---|---|
| 3,156,203 | 11/1964 | Adam et al. | 112/121.12 |
| 3,810,414 | 5/1974 | Gerber | 112/121.12 X |
| 3,867,889 | 2/1975 | Conner, Jr. | 112/121.11 X |
| 4,006,698 | 2/1977 | Scholl et al. | 112/121.11 |

*Primary Examiner*—Werner H. Schroeder
*Assistant Examiner*—Peter Nerbun
*Attorney, Agent, or Firm*—George B. Oujevolk

[57] ABSTRACT

A numerically controlled sewing machine for controlling the movement of a workpiece holding means according to a program made on the basis of a basic standard size of a basic standard piece and the shape of a basic standard seam to be formed on the basic standard piece.

The numerically controlled sewing machine includes detecting means for detecting the first difference between an actual size of a workpiece to be sewn and the basic standard size, and for dividing the first difference by two, size selecting means capable of manually selecting a size close to the actual size from among the basic standard size and a variety of standard sizes predetermined in a given increment, value generating means for generating a half value of the second difference between the size selected by the size selecting means and the basic standard size, compensating means for compensating the length necessary to feed the workpiece from a loading station to a sewing station by summing up a half value of the first difference, a half value of the second difference, and a feeding length predetermined on the basis of the basic standard piece, stitch change means for changing the number of stitches to be formed in the workpiece according to the second difference.

7 Claims, 15 Drawing Figures

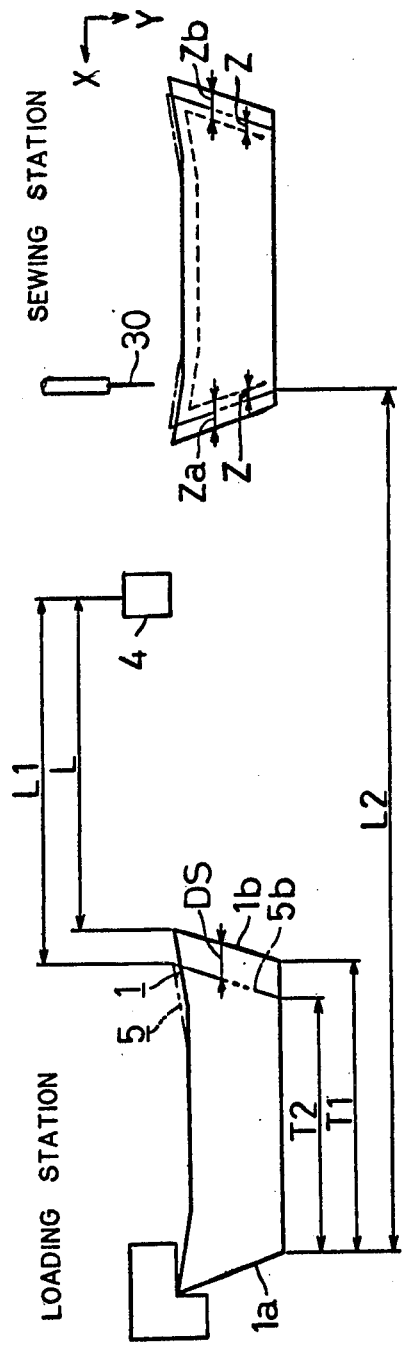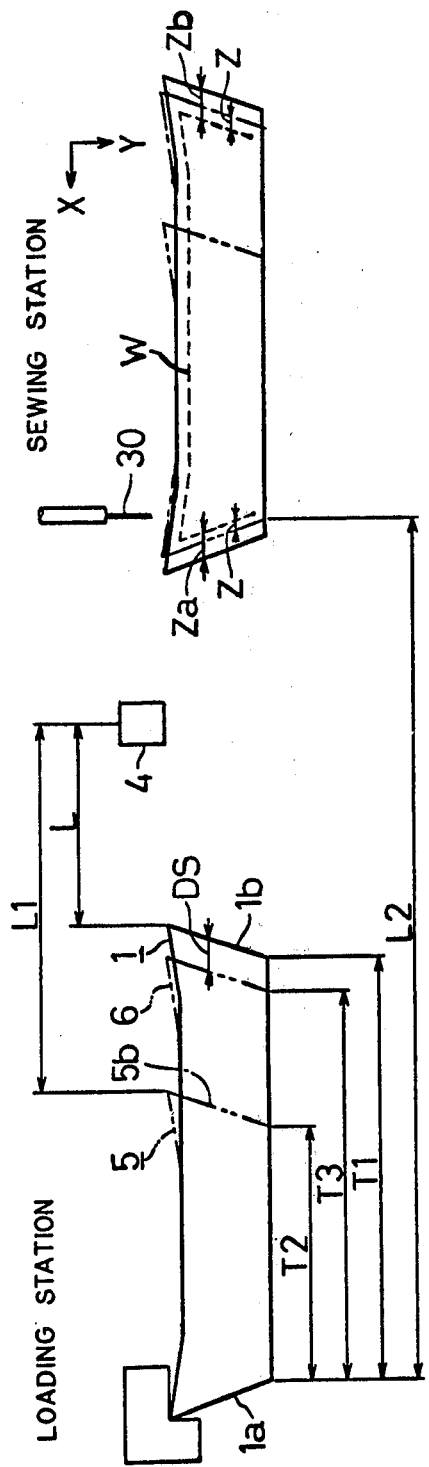

FIG. 5

PROGRAM

```
X -1380  M7   CR
X -6480  M2   CR
M3  CR
X- 5   Y15   J 5   CR
X- 6   Y15   J 9   CR
X- 7   Y16   J15   CR
         ⋮

X 17   J 73   CR
X 17   M 6    CR
X 17   M 6    CR
X 16   M 6    CR
X 16   M 6    CR
X 17   M 6    CR
X 17   M 6    CR
X 17   J 73   CR
         ⋮

X- 7   Y-16   J 15   CR
X- 6   Y-15   J 9    CR
X- 5   Y-15   J 5    CR
M4  CR
X 4   Y15   J 5   CR
M5  CR
```

NUMERICALLY CONTROLLED SEWING MACHINE

BACKGROUND OF THE INVENTION

This invention relates to a numerically controlled sewing machine capable of compensating the length necessary to feed a workpiece to be sewn from a loading station to a sewing station according to the actual size of said workpiece.

BRIEF REVIEW OF THE PRIOR ART

Heretofore, in a numerically controlled sewing machine, it has been the usual practice that, with regard to a workpiece being seamed, the space from the margin to seam covered an area from an edge of the workpiece to a portion being seamed which was maintained substantially in a given size. The workpiece was set in place at a loading station with the reference edge thereof spaced apart by a given distance from a sewing machine disposed in a sewing station. Throughout the specification, the expression margin to seam refers to an area from one edge of a workpiece to a seam portion thereof. The workpiece is fed by a given feeding length from the loading station to the sewing station, which given feeding length is recorded in a program prepared beforehand, and the reference edge of said workpiece is positioned usually at a fixed point in the sewing station relative to the sewing machine. Subsequently, the workpiece is transferred by a given number of stitches in a given sewing direction by the running of pulse motors, according to the program, whereby a series of stitches are formed on the workpiece in conformity with a desired shape of seam.

Where it is desired to make a seam on a variety of workpieces of the same configuration but greatly varying in size from one another, it is necessary to predetermine a plurality of standard sizes in a given increment, according to sizes of the workpieces to be sewn. Based upon the standard sizes thus determined and the shape of the seam, a variety of programs must be prepared, so as to meet each standard size. Among the variety of programs thus prepared, a program corresponding to an actual size of the workpiece being sewn is selected, and according to the program thus selected, the workpiece is seamed in the manner described.

In cutting, however, there is occasionally the situation where the workpiece has not been cut exactly to a given size, with a resultant difference between the basic standard size or standard size recorded in the program and the actual size of the workpiece thus cut. In such a case, if the reference edge of the workpiece to be sewn is positioned usually at a fixed point in the sewing station, then it follows that the margin to seam of the workpiece on the side opposite to said reference edge becomes different in size from that on the side of the reference edge. Thus, there is an unequal size between the margins to seam on the opposite sides of the workpiece which results, impairing the value of a product. On the other hand, it is undesirable from the viewpoint of maintenance of a program to prepare a variety of programs so as to meet individual workpieces, with a view to sewing a variety of workpieces greatly different in size from one another. Furthermore, whenever a workpiece different in size is sewn, a program tape need be renewed to be set on a tape reader.

OBJECTS OF THE INVENTION

It is accordingly an object of the present invention to provide a numerically controlled sewing machine, wherein a workpiece is sewn in such a manner that a margin to seam provided along the reference edge of said workpiece is maintained equal in size to that provided along the other edge thereof.

It is another object of the present invention to provide a numerically controlled sewing machine, wherein a variety of workpieces greatly different in size are sewn with high efficiency according to a single program, without employing a plurality of programs corresponding to individual workpieces of different sizes.

SUMMARY OF THE INVENTION

Briefly stated, according to the inventive concept relating to a numerically controlled sewing machine, a holder for holding a workpiece such as a material for a collar is shifted according to a program prepared beforehand, whereby a series of stitches are formed on the workpiece in conformity with the desired shape of the seam. More particularly, the present invention contemplates a numerically controlled sewing machine, wherein a workpiece held on a holder in the loading station is fed therefrom to a sewing station in which a sewing machine is disposed, and set in place therein. Thereafter the workpiece is intermittently transferred in a given direction, and the workpiece is seamed by the sewing machine.

A basic standard size and a number of standard sizes are predetermined, based upon the physical proportions of users. According to the present invention, with a view to detecting a first difference between an actual size of a workpiece to be sewn and a basic standard size, there is provided between the loading station and the sewing station a sensor for sensing presence or absence of the workpiece to be sewn. On the assumption that a basic standard piece is to be cut precisely to the basic standard size, a detecting length L1 and a feeding length L2 are determined beforehand. The detecting length L1 covers a distance from the edge opposite to the reference edge of a workpiece located in the loading station to a point at which the opposite edge of the basic standard piece is sensed by said sensor, and said feeding length L2 covers a distance from the loading position of a workpiece to a sewing position to which said basic standard piece is fed.

The information such as the basic standard size, detecting length L1, feeding length L2 and the shape of a basic standard seam to be formed in the basic standard piece are recorded as a single program.

A workpiece to be sewn is placed in position of the loading station, with the reference edge thereof spaced apart by a given distance from said sewing machine. Then, the size selecting means is manipulated so as to select a standard size closest to an actual size of the workpiece from among the basic standard size and said number of standard sizes predetermined. Subsequently, a second difference between the standard size selected and the basic standard size is divided by two. Then, a first difference between the actual size of the workpiece and the basic standard size is divided by two responding to a signal from said sensor. Respective half values of the first and second differences are added to or substracted from the feeding length L2 determined beforehand, thereby compensating the length for feeding said workpiece in the feeding direction from the loading station to the sewing station. After the workpiece has been fed by a length thus compensated to position in place in the sewing station, the means for changing the number of the stitches in response to a signal from said size selecting means is actuated, whereby a given number of stitches predetermined based upon the size selected are formed on the workpiece by the sewing machine.

The invention as well as other objects and advantages thereof will be more apparent from the following detailed description when taken together with the accompanying drawings, in which:

BRIEF DESCRIPTION OF THE DRAWINGS

FIGS. 2 and 3 illustrate the condition in which a workpiece is fed from a loading station to a sewing station, respectively;

FIG. 5 is a program to be employed in the embodiment;

DETAILED DESCRIPTION OF A PREFERRED EMBODIMENT

Figure 1:
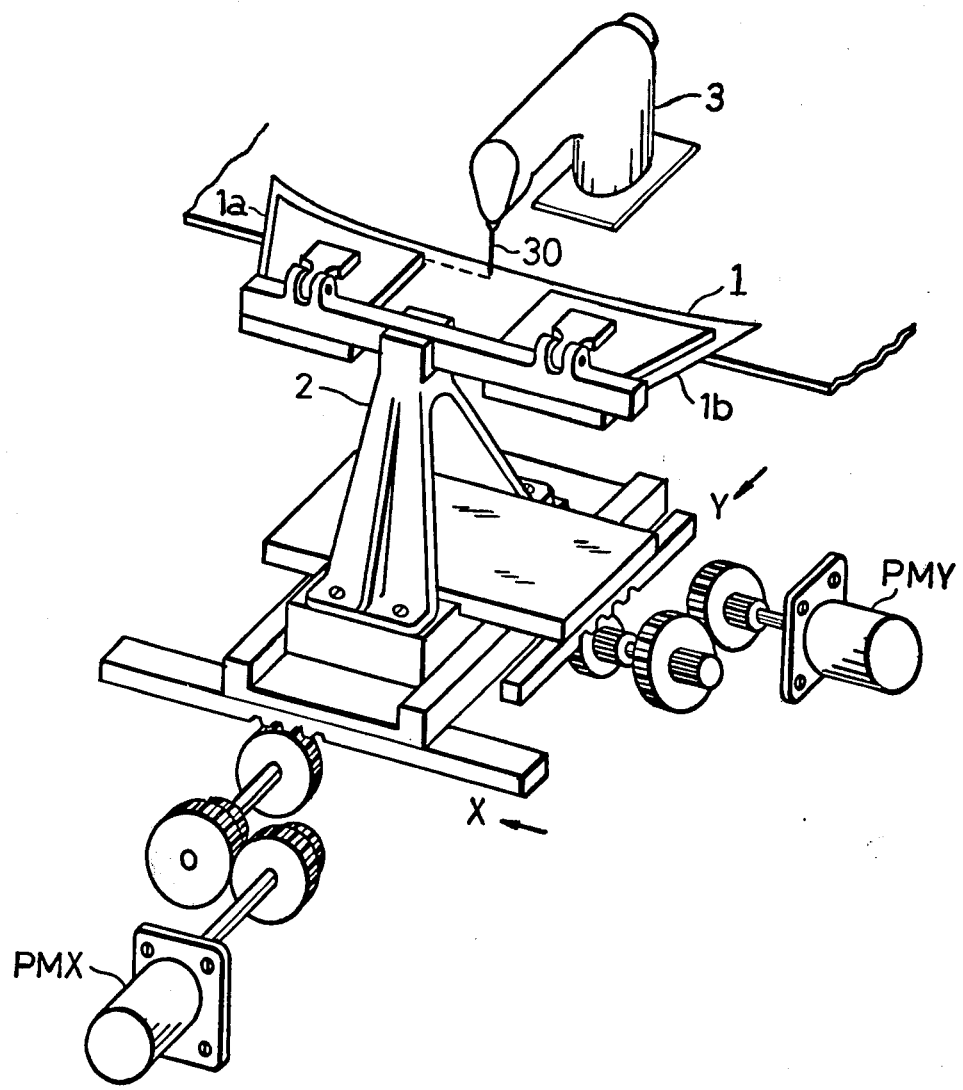
FIG. 1 is an explanatory view of a numerically controlled machine employed in an embodiment of the present invention.

The present invention will be referred to in detail, in conjunction with the drawings which indicate a preferred embodiment.

A workpiece to be sewn 1 is placed on a holder 2 in a loading station and then fed therefrom to a sewing station so as to be seamed in conformity with a desired shape by a sewing machine 3. The workpiece 1 has a bisymmetrical contour with reference to an axis perpendicular to the feeding direction from the loading station to the sewing station. In this case, the edge 1a remotest from the sewing machine 3, of the workpiece 1, located in the loading station is spaced apart by a given length from the sewing machine 3. The other edge 1b nearest to the sewing machine 3, of the workpiece 1 located in the loading station is sensed by a sensor 4 when said edge passes therethrough, said sensor being disposed between the loading station and the sewing station. Based upon the physical proportions of users, a basic standard size T2 and a number of standard sizes in a given increment are predetermined. For descriptive convenience, let us assume a basic standard piece 5 being cut precisely to the basic standard size T2, and a standard piece 6 being cut precisely to a standard size most close to an actual size T1 of the workpiece to be sewn 1, as shown in FIGS. 2 and 3. There are predetermined a detecting length L1 covering a distance from a point in the loading station at which the edge 5b nearer to the sewing machine, of the basic workpiece 5 is located to a point at which said edge is sensed by the sensor 4, as well as a feeding length L2 in which the basic standard piece 5 is fed from the loading station to the sewing station. A program is prepared according to information such as the number of pulses N1 and N2 determined based upon the detecting length L1, feeding length L2 and a unit length of shift of the holder 2, in which the holder 2 is shifted along the X-axis or Y-axis when one pulse is applied to a pulse motor; the X, Y numbers of pulses in the x-direction and y-direction parallel respectively to the X, Y-axes which cross each other at a right angle, which are determined based upon a direction of sewing and the unit length of shift of the holder; and the number of stitches to be formed. The information in the program 7 is encoded to be recorded on a program tape 8. A tape reader 9 reads the information from the program tape 8 and applies same to a decoder 10. The decoder 10 decodes whether the codes thus applied as inputs are numeral codes or literal codes, to thereby produce output signals. The output signals from the decoder 10 are stored through a gating circuit 11 in a literal register 12 and a numeral register 13, respectively. When subsequent output signals are applied from the decoder 10 to the numeral and literal registers, the information stored in respective registers 12 and 13 are cleared, so that the subsequent signals can be stored therein. The code signals of the number of pulses N1 determined based upon the detecting length L1 are applied to a first accumulator 14, while the code signal of the number of pulses N2 based upon the feeding length L2 are applied to a second accumulator 15. The first accumulator consists of a first shift register 142 and a first full adder 141. The second accumulator 15 consists of x-,y-full adders 151x, 151y, and x-, y-shift registers 152x, 152y. A pulse generating circuit 16 is provided for applying subtraction pulses to the first and second accumulators 14 and 15, when a needle 30 of the sewing machine is stayed above the workpiece 1, said pulse generating circuit is so arranged that a change in frequency of the subtraction pulses is permitted. A zero discriminator 17 discriminates whether or not the number of pulses being stored in the x-, y-shift registers 152x, 152y is zero. When the zero discriminator 17 determines that the number of pulses is zero, the pulse generating circuit 16 interrupts generation of subtraction pulses. A dividing circuit 18 divides the number of pulses being stored in the first shift register 142 into halves, and when the sensor 4 has sensed the passing of the edge 1b of the workpiece 1 therethrough, a gate G1 is opened and the number of pulses thus divided is applied to the x-full added 151x and x-shift register 152x. A size selecting switch 190 disposed in the size selecting circuit 19 has 10 contact terminals corresponding to the basic standard size T2 and nine standard sizes determined in a given increment. If an operator manipulates the size selecting switch 190, then the size selecting circuit 19 encodes one numeral selected from among the numerals of 0 to 9, thereby producing outputs. A stitch controlling circuit 20 includes a stitch accumulator 21, a stitch-zero discriminator 22, and an accessory register 23. The stitch accumulator 21 is composed of a stitch full adder 211 and a stitch shift register 212, and the code signals of the number of stitches to be formed on the workpiece 1 are stored in the stitch shift register 212. The stitch-zero discriminator 22 determines whether or not the number of stitches being stored in the stitch shift register 212 is zero, and according to the result of discrimination, renders gates G2 and G5, or a gate G3 open. The accessory register 23 consists of an x-accessory register 23x and a y-accessory register 23y. When the tape reader 9 reads J or M6 and the signals relating to the number of stitches are applied as inputs to the stitch controlling circuit 20, then the x, y numbers of pulses in the x-direction and y-direction are applied to the x-, y-shift registers 152x, 152y, as well as the x-,y-accessory registers 23x, 23y. A multiplier 24 increases a numeral selected by the size selecting circuit 19 by 50 times, thereby producing outputs. Pulse motors PMX and PMY in the x-direction and y-direction are respectively run by driving signals from a pulse motor driving circuit 25, and step in synchronism with the subtraction pulses from the pulse generating circuit 16.

Operation will be referred to below:

In the embodiment shown, it is predetermined that the basic standard size T2 is 350mm, and the standard sizes are 360mm, 370mm, 380mm, . . . 430mm, and 440mm increasing by degrees. The holder 2 is shifted in the x-direction or y-direction by a unit length of shift of 0.1 mm per step of the pulse motor PMX or PMY. By determining the directions of the arrow in FIG. 1 as a positive x-direction and positive y-direction, the number of pulses given in the program 7 is determined as being positive or negative. The numbers of pulses N1 and N2 are determined as 1380 pulses and 6480 pulses, respectively.

A description will be first given to the case where the workpiece 1 having substantially the same size as the basic standard size T2 is sewn.

Figure 7:
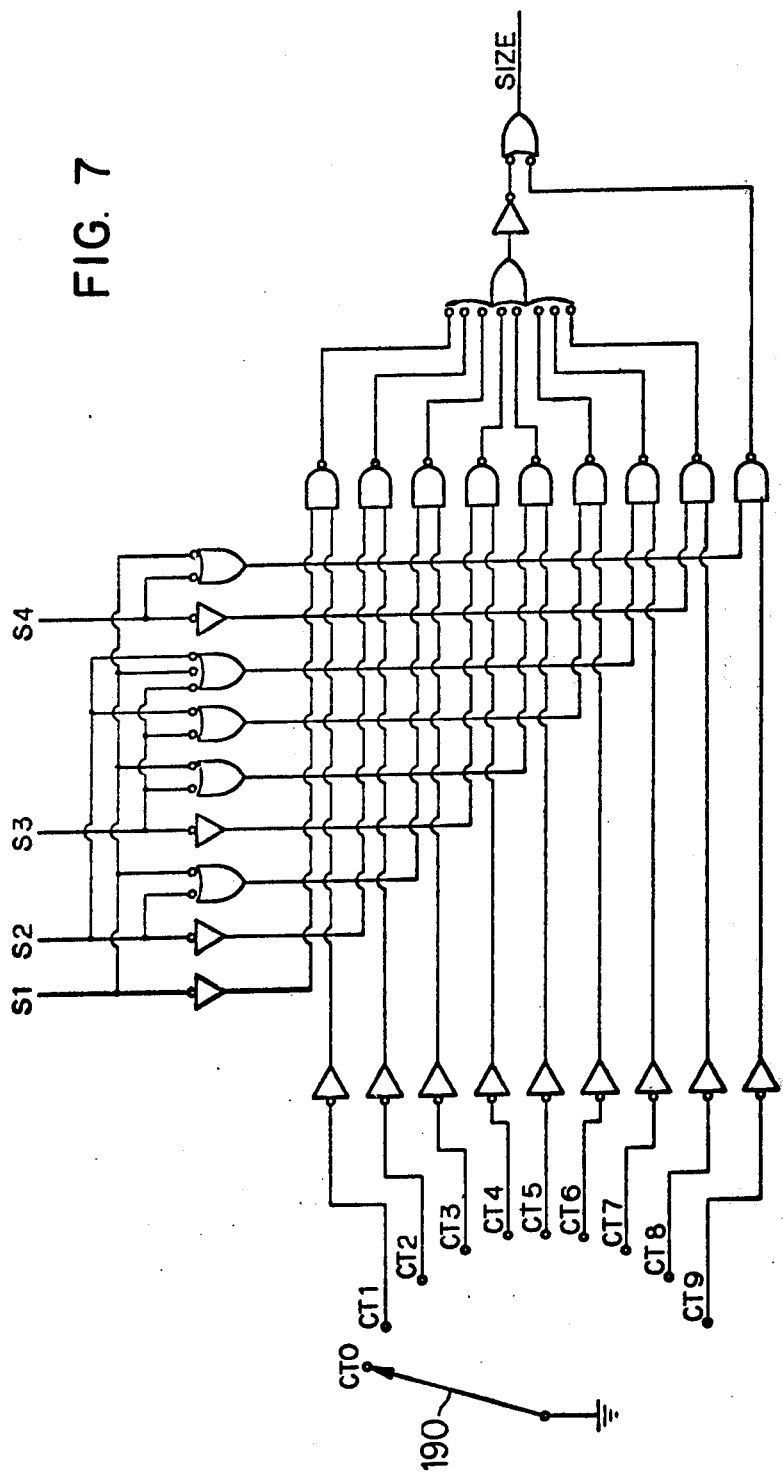
FIG. 7 is a diagram of a size selecting circuit in the embodiment.
Figure 8:
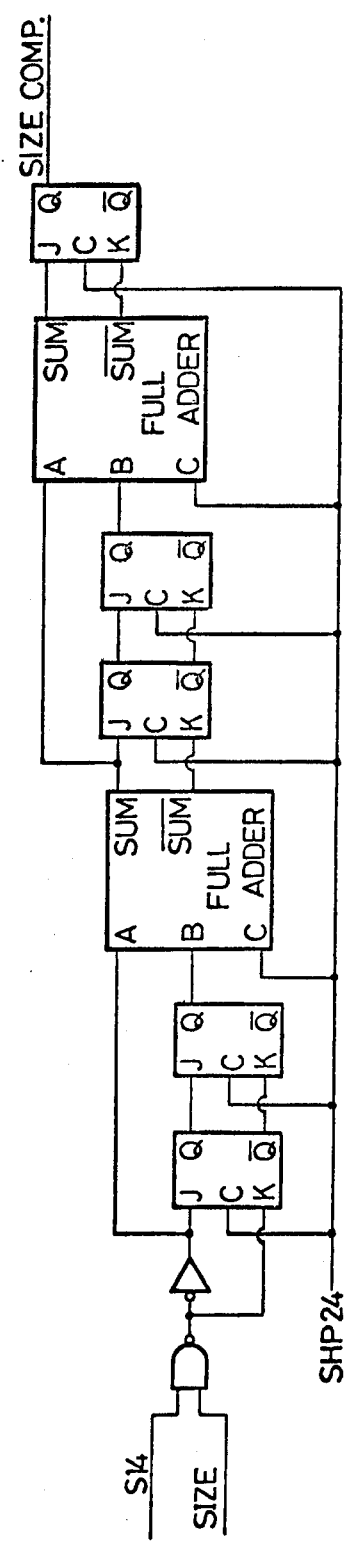
FIG. 8 is a diagram of a multiplier in the embodiment.
Figure 9:
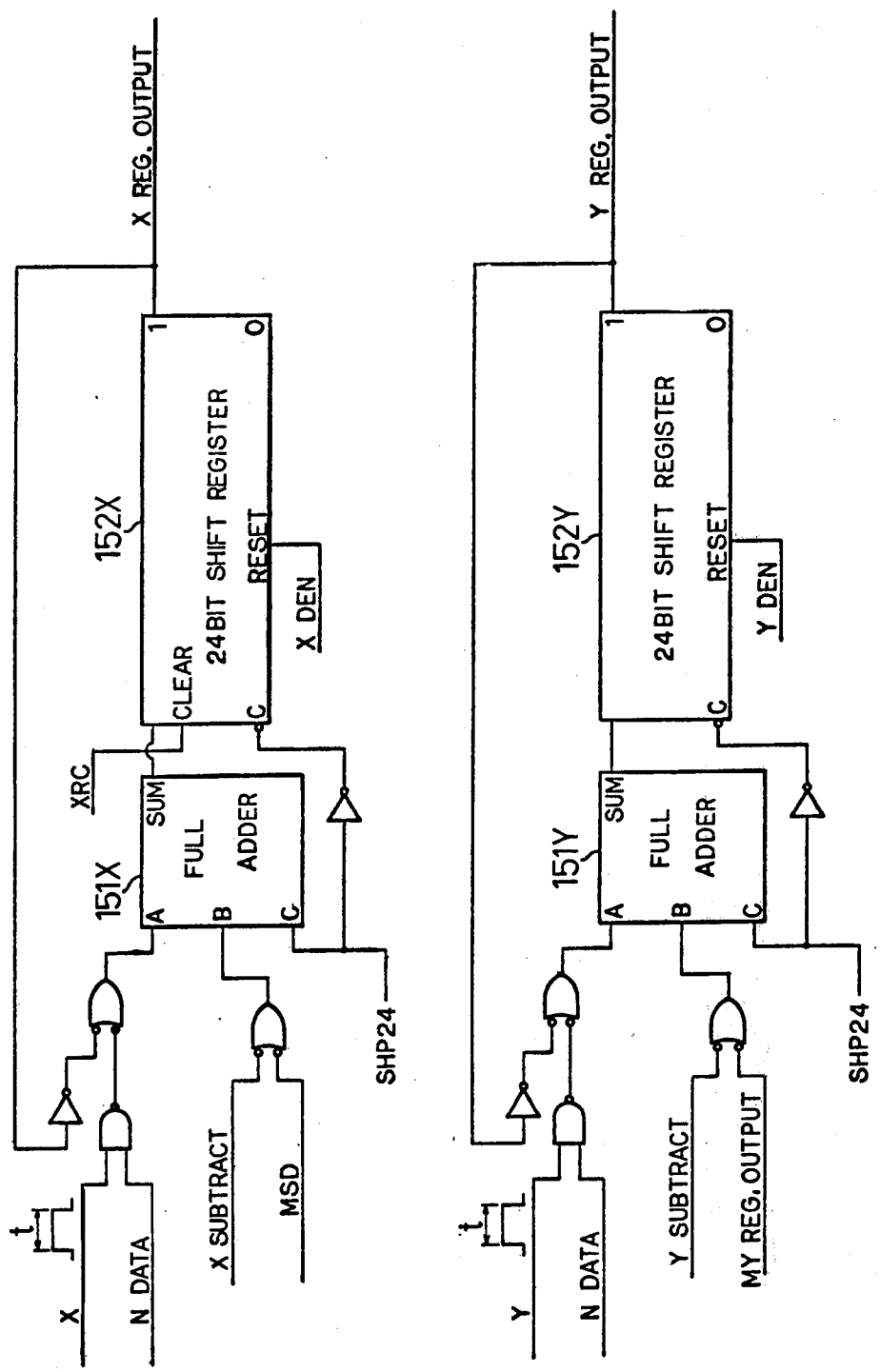
FIG. 9 is a diagram of a second accumulator in the embodiment.
Figure 10:
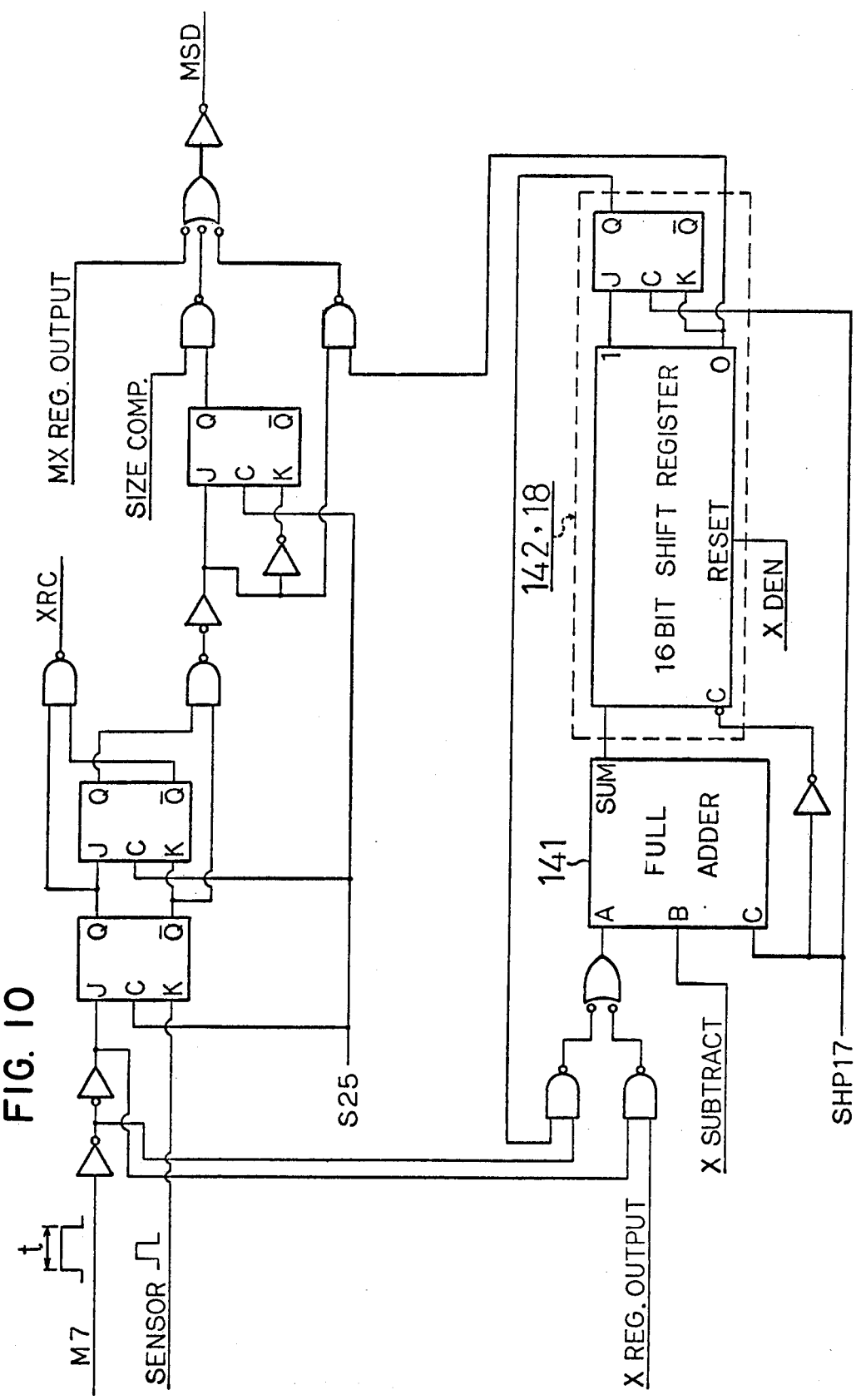
FIG. 10 diagrammatically shows a first accumulator and a dividing circuit in the embodiment.
Figure 11:
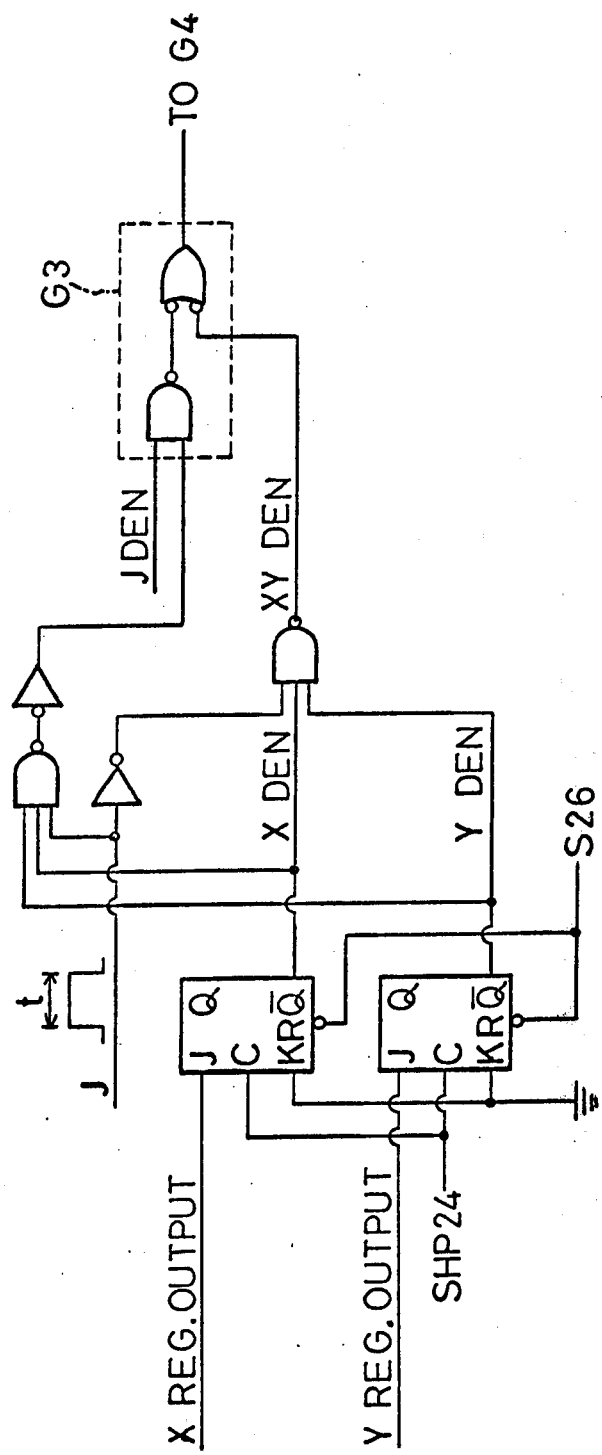
FIG. 11 is a diagram of a zero discriminator in the embodiment of the present invention.
Figure 12:
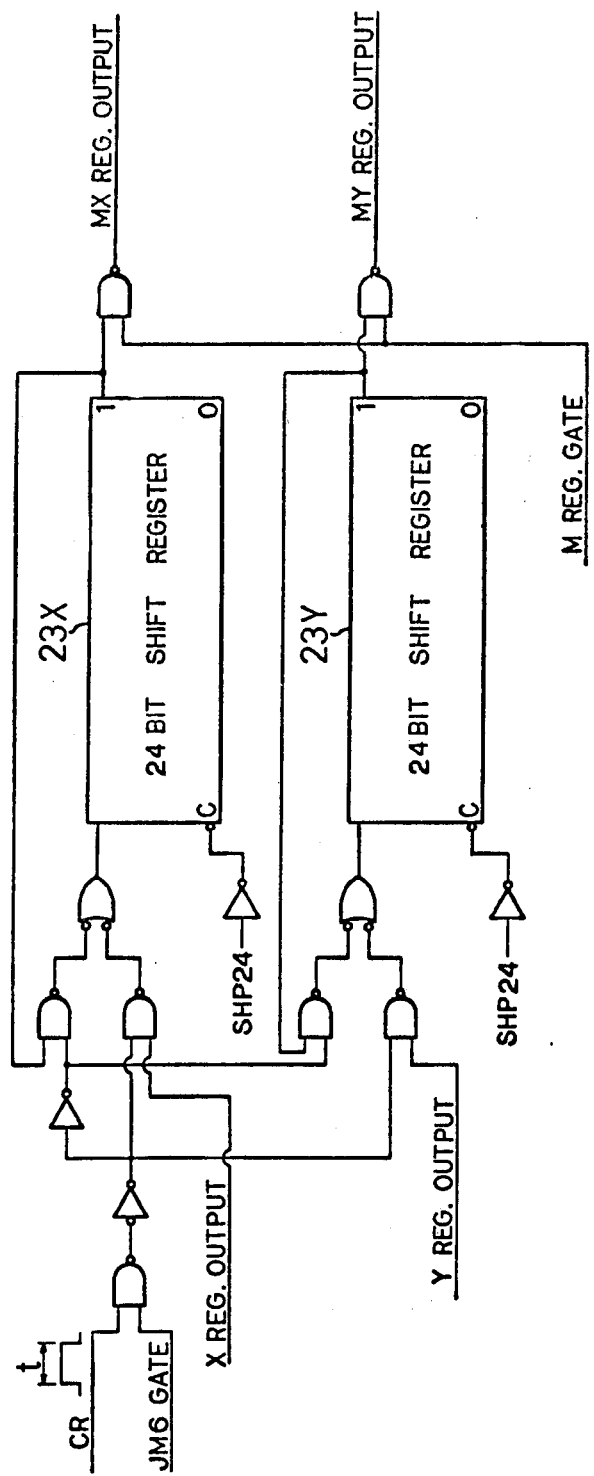
FIG. 12 is a diagram of an accessory register in the embodiment.
Figure 13:
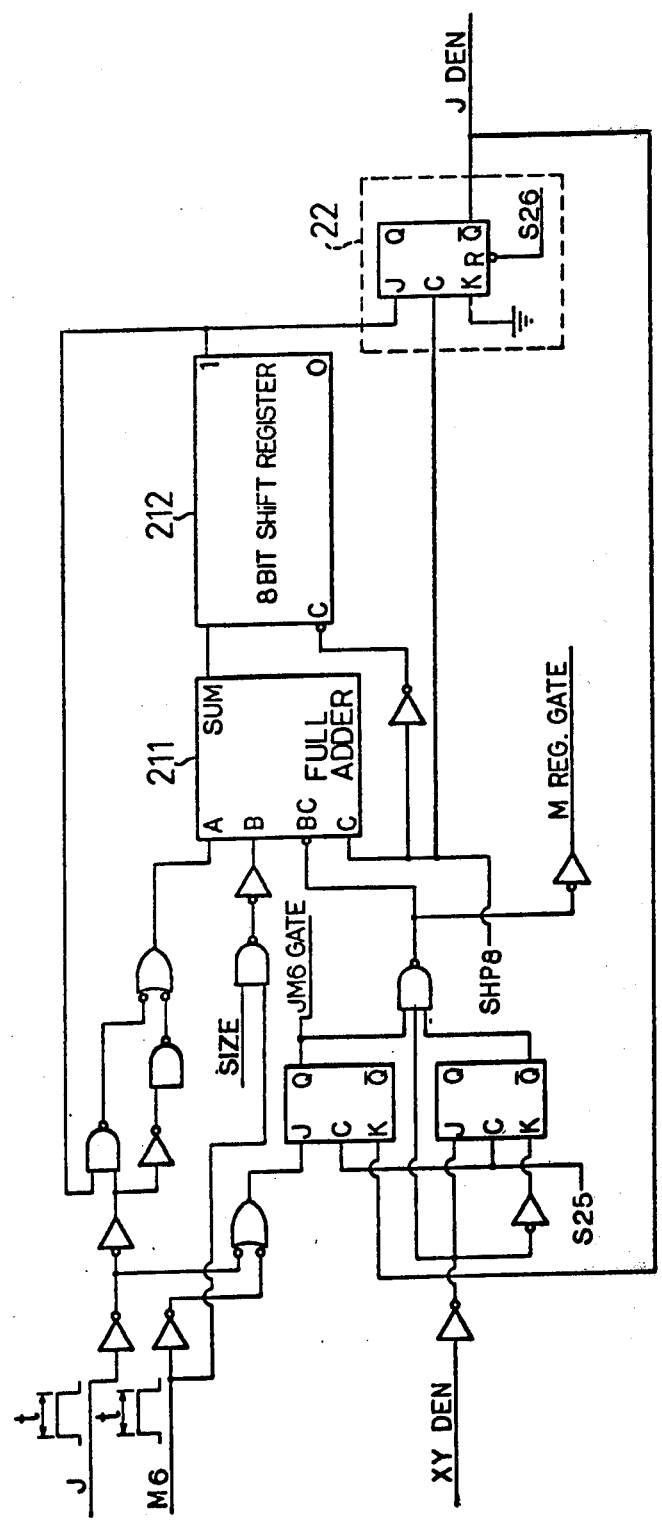
FIG. 13 is a diagram of a stitch controlling circuit in the embodiment.
Figure 14:
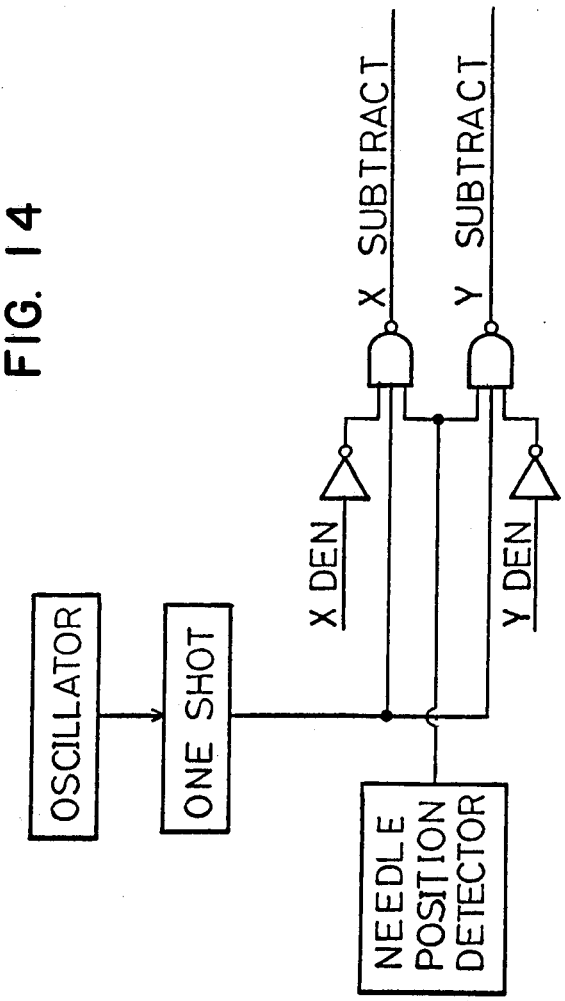
FIG. 14 is a diagram of a pulse generating circuit thereof.
Figure 15:
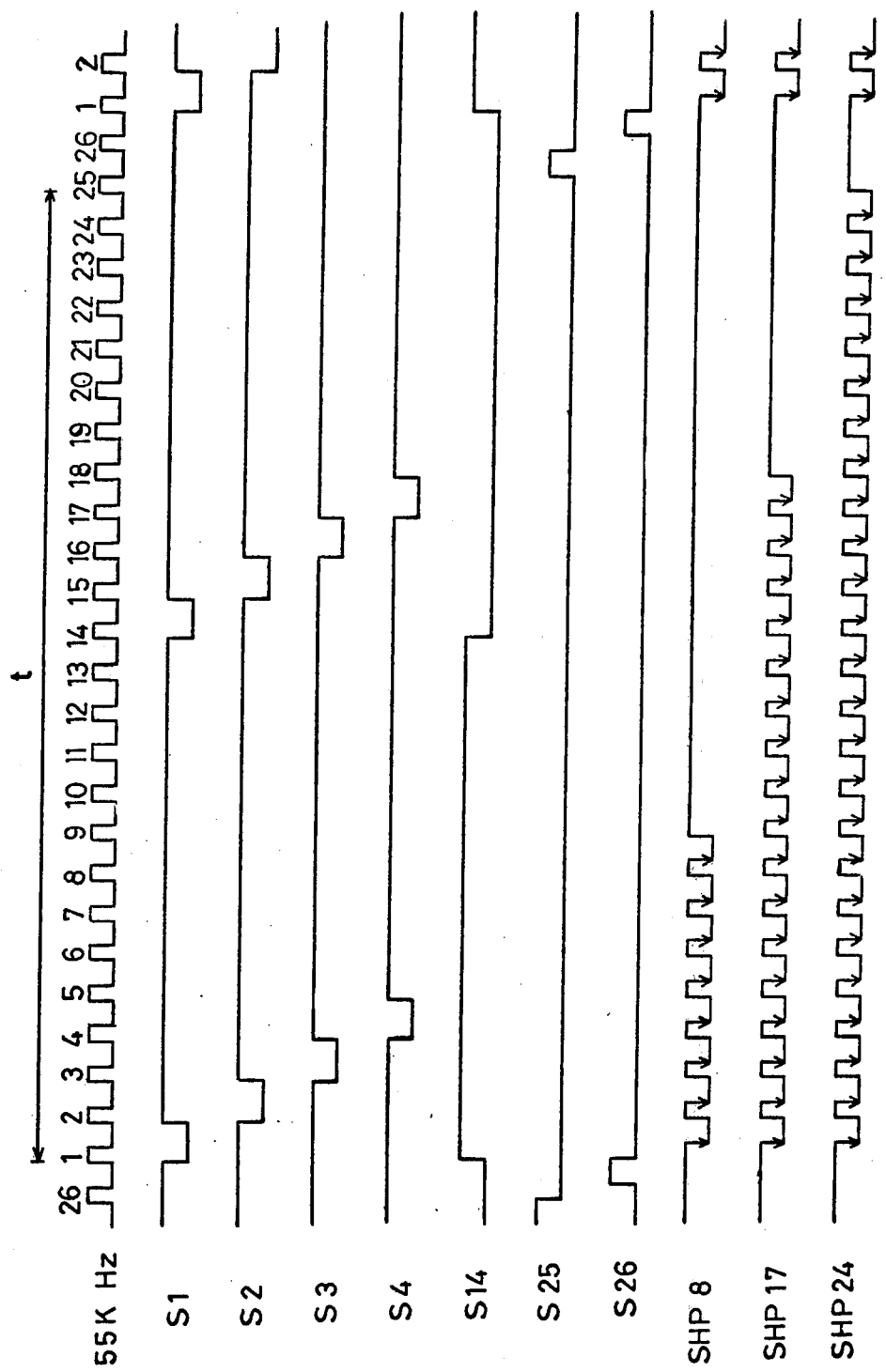
FIG. 15 is illustrative of pulse shapes employed in the embodiment.

The size selecting switch 190 is first set to the contact terminal CTo, as shown in FIG. 7. Then, the positioning of the workpiece to be sewn 1 in the loading station is effected, as said workpiece is held on the holder 2, as seen in FIG. 2. Subsequently, the tape reader 9 reads the number of pulses N1 from the program tape 8 and applies the code signals of the number of pulses N1 through the gating circuit 11 and numeral register 13 to the first and second accumulators as inputs. When the tape reader 9 has read M7 and the code signals of M7 have been applied as inputs through the gating circuit 11, and the literal register 12 to the second accumulator 15, the information stored in the x-shift register 152x will be cleared off. When the tape reader 9 reads CR, then the decoder 10 applies the code signals of CR, i.e., a command signal of reading to the tape reader 9. When the tape reader 9 reads the number of pulses N2, then the code signals of the number of pulses N2 will be applied as inputs to the second accumulator 15 alone. As a result, the code signals of the numbers of pulses N1 and N2 will be stored in the first shift register 142 and the x-shift register 152x, respectively. When the tape reader 9 reads M2, the subtraction pulses from the pulse generating circuit 16 will be applied as inputs to the first full adder 141 and the x-full adder 151x, respectively, and one pulse will be subtracted respectively from the number of pulses in the shift registers 142, 152x. At the same time, the pulse motor PMX will be driven in response to the x driving signals from the pulse motor driving circuit 25, whereby the workpiece 1 will be fed in the feeding direction from the loading station to the sewing station, more specifically in the x-direction.

When the sensor 4 senses the passing of the edge 1b of the workpiece 1 therethrough, the number of pulses divided by the dividing circuit 18 will be applied as input to the x-full adder 151. When the sensor 4 has sensed the passing of the edge 1b of the workpiece 1 therethrough, if the number of subtraction pulses is assumed of N3, said subtraction pulses being produced as outputs from the pulse generating circuit 16 during the feeding of the workpiece 1 from the loading station to the fixed position at which the edge 1b of the workpiece 1 is sensed by the sensor, then the first shift register 142 stores therein the number of pulses equal to a difference (N1 − N3) between the number of pulses N1 and the number of pulses N3. The dividing circuit 18 divides the number of pulses (N1 − N3) by two, thereby producing outputs. In case of the number of pulses thus divided is an odd number, fractions are rounded down and the number of pulses thus obtained is applied as an input to the x-shift register 152x. Assuming the absolute value of the number of pulses thus divided being $N (= |N1 - N3|/2)$, in case of the actual size T1 of the workpiece 1 being larger than the basic standard size T2 shown in FIG. 2, the information stored in the x-shift register 152x will be changed to a numerical value (N2−N3−N) obtained by subtracting said number of pulses N from the number of pulses (N2 − N3) in the x-shift register 152x. On the contrary, in case the actual size T1 of the workpiece 1 is smaller than the basic standard size T2, the information stored in the x-shift register 152x will be changed to a numerical value (N2−N3+N) given by adding the number of pulses N to the number of pulses (N2 − N3). Thus, the number of pulses in the x-shift register 152 is compensated, and change in the number of pulses necessary for feeding the workpiece 1 from the sensor 4 to the sewing station is bound to result.

Figure 4:
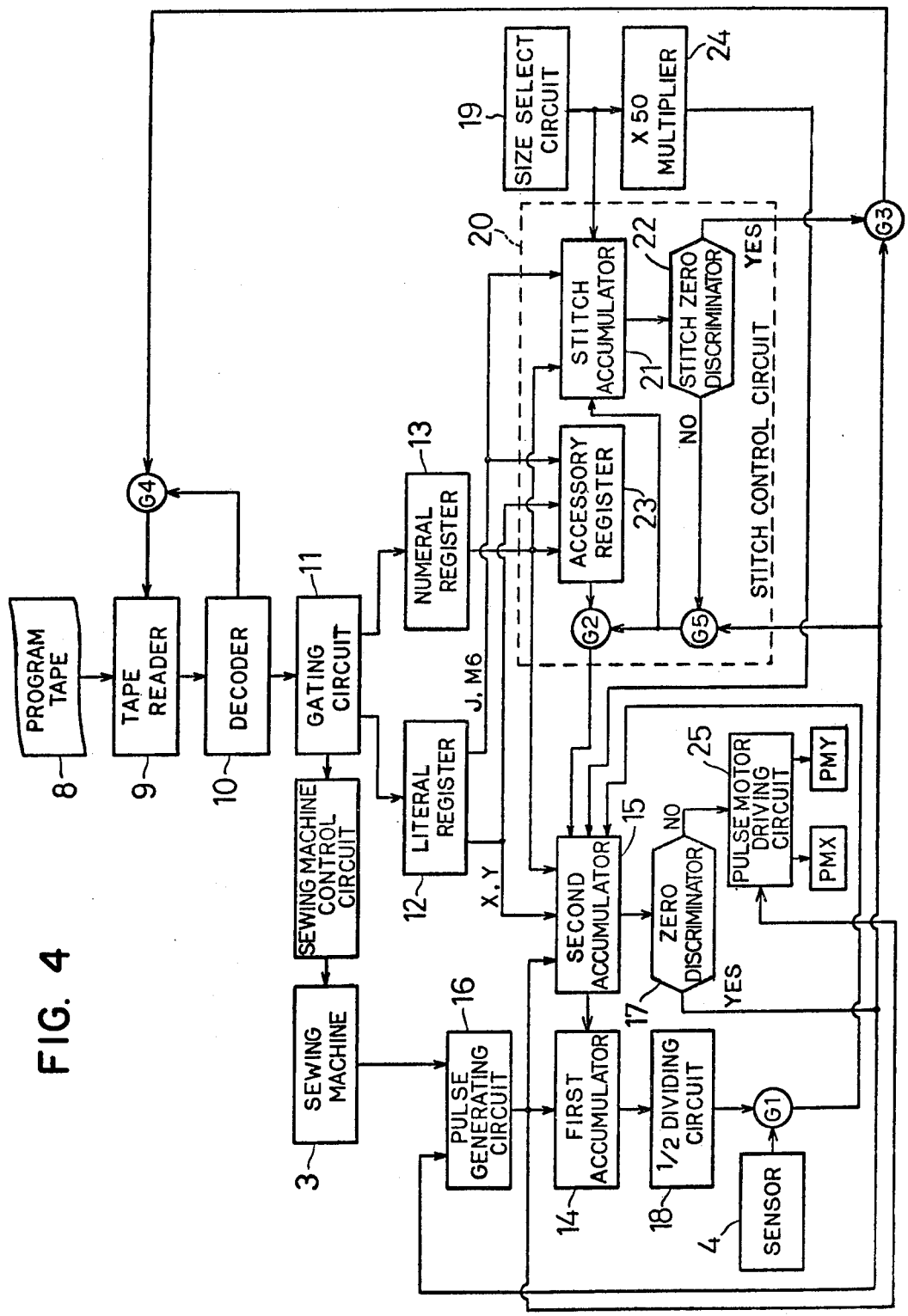
FIG. 4 is a flow chart showing the operation of the machine embodying the present invention.
Figure 6:
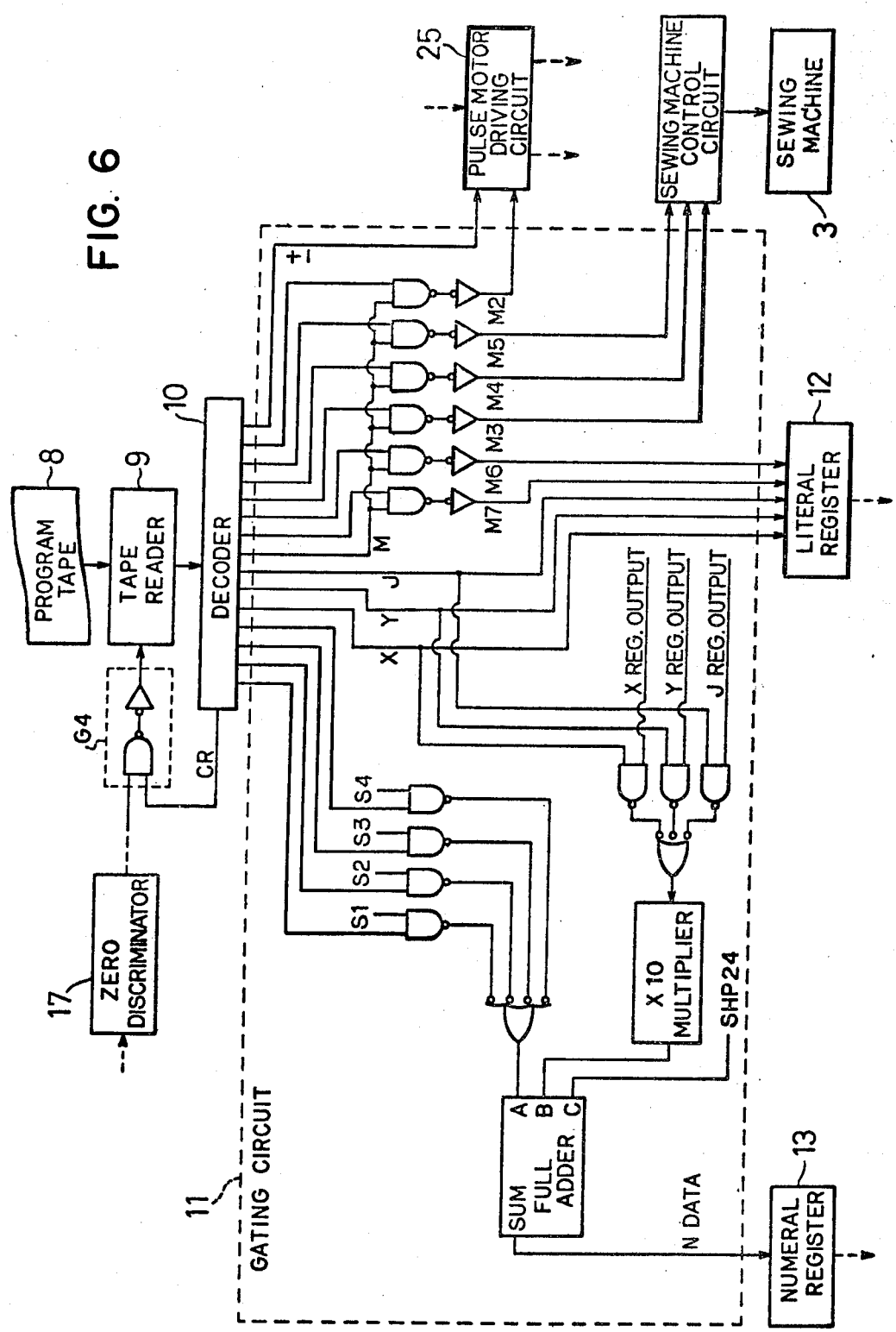
FIG. 6 shows a diagram of a gating circuit incorporated in the embodiment.

The number of pulses thus compensated in the x-shift register 152x will be reduced, with the feed of the workpiece 1 in the negative x-direction. Until the number of pulses in the x-shift register 152x is reduced to zero (for a duration which the zero discriminator 17 produces NO as outputs in FIG. 4), the x driving signals will be produced from the pulse motor driving circuit 25, so that the feed of the workpiece 1 in the negative x-direction by the pulse motor PMX will be continued.

When the workpiece 1, as shown in FIG. 2, reaches the sewing station and the zero discriminator 17 determines that the number of pulses in the x-shift register 152x is zero, the generation of subtraction pulses will be interrupted, and thereby the production of the x driving signals will be interrupted as well. As a result the zero discriminator 17 has determined that the number of pulses is zero, the first shift register 15 and the x-shift register 152x will be respectively reset, and thus the tape reader 9 will be actuated to read a subsequent information M3. Thus, a command signal of driving the sewing machine will be applied as an input to a sewing machine controlling circuit.

Following the positioning of the workpiece 1 in the sewing station, the tape reader 9 will read the x, y numbers of pulses in the x-direction and y-direction, as well as the number of stitches to be formed. The code signals of the x, y numbers of pulses in the x-direction and y-direction will be stored in the x-, y-shift registers 152x, 152y, as well as in the x-, y- accessory registers 23x, 23y. The code signals of the number of stitches will be stored in the stitch shift register 212. When the x, y numbers of pulses are stored in the x-, y-shift registers 152x, 152y and the needle 30 of the sewing machine 3 is stayed above the workpiece 1, then the subtraction pulses from the pulse generating circuit 16 will be applied to these x-, y-shift registers 152x, 152y, thereby reducing the number of pulses in these shift registers 152x and 152y sequentially one by one. When the zero discriminator 17 determines that the x, y numbers of pulses in these shift registers 152x and 152y has been reduced to zero, then the number of stitches stored in the stitch shift register 212 will be subtracted by one stitch. At the same time, the x-, y-shift registers 152x and 152y will be both reset, and subsequently the x, y numbers of pulses in the x-, y-directions will be applied to these shift registers 152x and 152y, respectively. The subtraction pulses from the pulse generating circuit 16 will again be applied to these shift registers 152x and 152y, thereby reducing the x, y numbers of pulses in these shift registers. The above operation will be cyclically effected until the number of stitches in the stitch shift register 212 becomes zero. Thus, the workpiece 1 is intermittently transferred in a given sewing direction by the pulse motors PMX and PMY, whereby the stitches will be formed on the workpiece 1 by the number predetermined based upon the basic standard size T2. At the same time, the stitch-zero discriminator 22 discriminates that the number of stitches in the stitch shift register 212 becomes zero, thereby resetting the stitch shift register 212, as well as rendering the gate G2 open, whereby a command signal of reading will be given to the tape reader 9. The tape reader 9 will read the x, y numbers of pulses in the x-, y-directions as well as the number of stitches for a subsequent operation. When the tape reader 9 has read M6, the code signals for a numeral selected by the size selecting circuit 19 will be stored in the stitch shift register 212, and the numeral thus selected is employed as the number of stitches for sewing the workpiece 1. Since the numeral thus selected is 0 in this case, then the number of stitches need not be subjected to alteration, and thus the stitches will be formed on the workpiece 1 in conformity with the shape of a basic standard seam predetermined based upon the basic standard size T2.

The embodiment shown will be more concretely described. For example, in case the actual size T1 of the workpiece 1 is 350.5mm, larger than the basic standard size T2 (350mm), a difference between both sizes is 0.5mm. If the difference in size is converted into the number of pulses, then the size difference of 0.5mm corresponds to five pulses. The absolute value N which is given by dividing the number of pulses by the dividing circuit 19 and from which fractions are rounded down will be 2. The number of pulses necessary for feeding the workpiece 1 from the loading station to the sewing station will be a numerical value of 6478 which is given by subtracting 2 from the number of pulses N2 (6480). The margins to seam Za and Zb along the opposite edges 1a and 1b of the workpiece 1 will be a value [Z + (DS/2)] which is given by adding a value of one half of the size difference DS to the values of margins to seam Z in the opposite edge portions of the basic standard workpiece 5, respectively. In case of the size T1 being 349.6mm, a size difference between the basic size and the size T1 will be 0.4mm, and corresponds to four pulses when converted into the number of pulses. The number of pulses necessary for feeding the workpiece 1 from the loading station to the sewing station will by 6482, which value is given by adding 2 to the number of pulses N2. The margins to seam Za and Zb along the opposite edges 1a and 1b of the workpiece 1 will be [Z − (DS/2)] which is given by subtracting a value of one-half of size difference Ds from the sizes of the margins to seam provided along the opposite edges of the basic standard workpiece 5, respectively. The difference in size is apportioned equally to the left and right marginal portions in the manner described, so that the left and right margins to seam will be equal in size, whereby the seams will be formed in mirrorimage relationship along the opposite sides of the workpiece.

The description will be given of the case where it is desired to sew the workpiece 1 greatly different in size in the x-direction from the basic standard size T2, in conjunction with FIG. 3.

A standard size T3 closest to the actual size T1 of the workpiece 1 is selected from among 9 standard sizes predetermined in a given increment. The size selecting switch 190 is manipulated to be set to the contact terminal corresponding to the standard size T3 thus selected. As a result, the size selecting circuit 19 will apply as outputs the code signals commensurate in number with the standard size T3 to the multiplier 24. The multiplier 24 will produce as outputs the code signals of the number of pulses predetermined between the standard size T3 and the basic standard size T2. After the tape reader 9 has read M7 and the information in the x-shift register 152x has been cleared off, the code signals from the multiplier 24 will be applied to the x-shift register 152x. The number of pulses N2 of the information for a subsequent operation and the code signals thus multiplied will be added to each other in the x-full adder 151x and then stored in the x-shift register 152x.

The succeeding operations are the same as the case where the workpiece is of the same size as when the basic standard size T2 is sewn. In detail, the workpiece 1 will be positioned in place in the sewing station as shown in FIG. 3. Subsequently, when the tape reader 9 reads the x, y numbers of pulses in the x-, y-directions and the number of stitches which are the information for a subsequent operation, then the code signals of the x, y numbers of pulses in the x-, y-directions will be stored in the x-, y-shift registers 152X, 152y as well as x-, y-accessory registers 23x, 23y, respectively. The code signals of the number of stitches to be formed will be stored in the stitch shift register 12. As soon as this information is all stored in respective registers, the sewing machine 3 will be run and the subtraction pulses will be produced as outputs from the pulse generating circuit 16, thereby subtracting the x, y numbers of pulses in the x-, y-shift registers. Simultaneously with the above operation, the workpiece 1 will be intermittently transferred in a given sewing direction by the pulse motors PMX and PMY, whereby the given number of stitches will be formed on the workpiece 1. When the workpiece 1 is seamed to a portion W which extends linearly in the x-direction, the tape reader 9 will read the x number of pulses in the x-direction as well as M6. The code signals of the x number of pulses in the x-direction will be stored in the x-shift register 152x. When the code signals of M6 are applied as inputs to the stitch controlling circuit 20, the code signals corresponding in number with the standard size T3 will be applied as the number of stitches to the stitch accumulator 21 and stored in the stitch shift register 212. When the x number of pulses in the x-shift register 152x is subtracted by the subtraction pulses from the pulse generating circuit 16 and the zero discriminator 17 determines that the x number of pulses has been reduced to zero, then the number of stitches in the stitch shift register 212 will be subtracted by one stitch. Thus, the workpiece 1 will be intermittently transferred by the pulse motors PMX, and the stitches will be formed in the portion W extending linearly in the x-direction. The stitch-zero discriminator 22 maintains the gates G2 and G5 open while the $x,y$ numbers of pulses in the second accumulator 15 and the number of stitches in the stitch shift register 212 respectively become zero (for a duration which the zero discriminator 17 and stitch-zero discriminator 22, respectively produce a signal of YES and NO in FIG. 4), and the code signals of the $x$ number of pulses in the x-direction will be supplemented from the x-accessory register 23x to the x-shift register 152x. The $x$ number of pulses in the x-shift register 152x will be again subtracted. When the stitches are formed in excess in the portion W by the number selected by the size selecting circuit 19, and the stitch-zero discriminator 22 determines that the number of stitches is zero, then the Gate 3 will be rendered open, and at the same time, the Gate G4 will be rendered open by means of the code signals of CR, thereby giving a command signal of reading to the tape reader 9. The above-described operation will be cyclically effected, thereby changing the number of stitches in the portion W in the workpiece 1. If the tape reader 9 reads M4, then the sewing machine 3 will be run at low speed, and on the other hand, if the tape reader 9 reads M5, then the sewing machine will be stopped, as well as the workpiece 1 will be returned to the loading station.

It will be understood from the foregoing that the number of stitches in the portion W changes, so that the stitches will be formed on the workpiece 1 substantially the same in size as the standard size T3, in conformity with the shape of a standard seam predetermined based upon the standard size T3. Either in this case, the difference in size is apportioned equally to the left and right edge portions of the workpiece 1 likewise in the former case.

Next, description will be given to how the holder 2 usually resumes at the loading station, i.e., a starting point spaced apart by a given distance from the sewing machine 3.

When the holder 2 is positioned at the starting point in the loading station, the exciting condition of the stator phases being excited, among a plurality of stator phases of the pulse motor PMX which shifts the holder 2 is determined as the initial exciting condition. When a limit switch (not shown) disposed at the starting point of the holder 2 senses the arrival of the holder 2 at the starting point, excitation to the pulse motor PMX is interrupted. Thereafter, the stator phases of the pulse motor PMX is excited to the initial exciting condition. This ensures the positioning of the holder 2 exactly at the starting point in the loading station in the event of variation in switching operation of the limit switch.

A further example of the present invention will be given below. In case the actual size T1 of the workpiece 1 is 360.5 mm, the standard size T3 is regarded as 360 mm, and the size selecting switch 190 is set to the contact terminal CT1 shown in FIG. 7. A difference between the standard size T3 selected and the basic standard size T2 will be 10 mm, and the value of 10 mm corresponds to 100 when converted into the number of pulses. A difference between the size T1 and the size T2 will be 10.5 mm, and said size difference corresponds to 105 when converted into the number of pulses. Thus, the number of pulses necessary for feeding the workpiece 1 from the loading station to the sewing station will be a value which is given by subtracting 2 from the number of pulses N2, said value of 2 being given by the expression $[(105/2) - (100/2)]$ and by rounding down fractions. In case of the size T1 of the workpiece 1 being 369.6 mm, the size selecting switch 190 is set to the contact terminal CT2. In this case, the number of pulses necessary for feeding the workpiece 1 from the loading station to the sewing station will be a value which is given by adding 2 obtained by the expression $[(200/2) - (196/2)]$ to the number of pulses N2.

In the embodiment shown, there is used a master-slave JK flipflop, the output signals of which change in response to the trailing end of the clock-pulse. The shift registers used in the embodiment shown are composed of a master-slave JK flipflop.

As is apparent from the foregoing, according to the present invention, where it is desired to sew the workpiece substantially the same in size as the basic standard size, a value which is given by dividing a difference in the basic standard size and the actual size of the workpiece by two is added to or subtracted from the feeding length L2 covering a distance from the loading station to the sewing station, thereby compensating the length for feeding the workpiece in the feeding direction from the loading station to the sewing station. As a result, the margins to seam provided along the opposite edges of the workpiece become equal in size with each other, such that the seams are formed on the workpiece, with an improved external appearance. In case of the workpiece to be sewn has a size greatly different in the feeding direction from the basic standard size, then a value given by dividing by two a difference between a standard size closest to the actual size of the workpiece and the basic standard size, as well as a value given by dividing by two a different between the actual size of the workpiece and the basic standard size are added to or subtracted from the feeding length L2, respectively, thereby compensating the length for feeding the workpiece in the feeding direction. Furthermore, in the stitch forming portion linearly extending in the feeding direction, the number of stitches changes according to a difference between the standard size and the basic standard size, such that a series of stitches conforming to a desired shape of seam may be formed on a variety of workpiece greatly different in size, according to a single program. This ensures highly efficient, automatic sewing and the maintenance of the program is trouble free.

I claim:

1. A numerically controlled sewing machine for forming a seam, the shape of which is similar to that of a basic standard seam to be formed in a basic standard piece, in a workpiece having a contour similar to that of said basic standard piece comprising:
    a. means for holding said workpiece in a predetermined position at a loading station spaced from a sewing station in which sewing instrumentalities are disposed;
    b. driving means connected with said holding means for feeding said workpiece in the feeding direction from said loading station to said sewing station, and then intermittently transferring said workpiece in predetermined transferring directions relatively to said sewing instrumentalities in order to form said seam therein;
    c. first means for storing first information including at least the pulse number (N1) necessary to feed said basic standard piece held by said holding means from said loading station to said sewing station, and information necessary to form said basic standard seam in said basic standard piece at said sewing station, which includes second information representative of the direction and length of stitch in said basic standard seam and third information representative of the number of the same stitches to be successively formed in said basic standard seam, and for generating pulse signals according to said information in relationship with the position of a needle of said sewing instrumentalities;

d. second means for generating driving-signals in timed relationship with said pulse signals, and applying said driving signals to said driving means;

e. selecting means capable of manually selecting a standard size closest to an actual size of said workpiece from among said basic standard size and a variety of standard sizes which are respectively predetermined so as to be different from said basic standard size;

f. means for detecting the first difference between said actual size and said basic standard size in said feeding direction during feeding said workpiece from said loading station to said sewing station;

g. means for compensating the pulse number necessary to feed said workpiece in said feeding direction by summing up a half value of the pulse number (N2) corresponding to said first difference, a half value of the pulse number (N5) corresponding to the second difference between the standard size selected by said selecting means and said basic standard size, and said pulse number (N1); and, h. means for changing the number of stitches to be formed in said workpiece in at least one transferring direction by summing up said number of stitches in said third information and the number of stitches corresponding to said second difference.

2. A numerically controlled sewing machine according to claim 1, wherein said basic standard piece is formed into a bisymmetrical contour with reference to an axis perpendicular to said feeding direction, said basic standard size and said standard sizes are representative of each of the lengths of said basic standard piece and a variety of prearranged standard pieces respectively having said standard sizes in said feeding direction.

3. A numerically controlled sewing machine for forming a seam, the shape of which is similar to that of a basic standard seam to be formed in a basic standard piece, in a workpiece having a contour similar to that of said basic standard piece comprising:

a. means for holding said workpiece in a predetermined position at a loading station spaced from a sewing station in which sewing instrumentalities are disposed;

b. $x, y$ driving means connected with said holding means for feeding said workpiece along an $x$ axis from said loading station to said sewing station, and then intermittently transferring said workpiece along said $x$ axis and a $y$ axis perpendicular thereto relatively to said sewing instrumentalities in order to form a seam therein;

c. means for recording the first information including at least the $x$ pulse number (N1) necessary to feed said basic standard piece held by said holding means along said $x$ axis from said loading station to said sewing station, and information necessary to form said basic standard seam in said basic standard piece at said sewing station, which includes second information representative of the direction and length of stitch in said basic standard seam and third information representative of the number of stitches to be successively formed in the same direction to said direction of stitch;

d. means for reading said information in said recording means;

e. means for decoding the information read by said reading means;

f. first accumulating means for storing said $x$ pulse number (N1) and the $x, y$ pulse numbers decoded by said decoding means, said $x, y$ pulse numbers being predetermined in said second information in order to transfer said basic standard piece along said $x, y$ axes;

g. stitch accumulating means for storing said number of stitches decoded by said decoding means;

h. first generating means for generating $x, y$ pulse signals in relationship with the position of a needle of said sewing instrumentalities, and for applying said $x, y$ pulse signals to said first accumulating means so that the pulse numbers of said pulse signals are subtracted from the pulse numbers being stored in said first acccumulating means;

i. zero detecting means for interrupting said first generating means from generating said $x, y$ pulse signals when the pulse numbers being stored in said first accumulating means are respectively decreased to zero, and generating a pulse zero signal;

j. storage means for storing the $x, y$ pulse numbers respectively equal to said $x, y$ pulse numbers stored in said first accumulating means;

k. gate means being opened in response to said pulse zero signal for transmitting said $x, y$ pulse numbers stored in said storage means to said first accumulating means, and for transmitting said pulse zero signal from said interrupting means to said stitch accumulating means so that one is subtracted from the number of stitches being stored in said stitch accumulating means.

l. command means for applying a reading command signal to said reading means so that said reading means sequentially reads said information in said recording means when the number of stitches being stored in said stitch accumulating means is decreased to zero;

m. second generating means for generating the $x, y$ driving signals in timed relationship with said $x, y$ pulse signals, and applying said $x, y$ driving signals to said $x, y$ driving means.

n. selecting means capable of manually selecting a standard size closest to an actual size of said workpiece from among said basic standard size and a variety of standard sizes which are respectively predetermined so as to be different from said basic standard size.

o. detecting means for detecting the first difference between said actual size and said basic standard size in the direction parallel to said $x$ axis during feeding said workpiece from said loading station to said sewing station;

p. compensating means for compensating the $x$ pulse number necessary to feed said workpiece along said $x$ axis by summing up a half value of the pulse number (N2) corresponding to said first difference, a half value of the pulse number (N5) corresponding to the second difference between the standard size selected by said selecting means and said basic standard size and said pulse number (N1); and, q. change means for changing the number of stitches to be formed in said workpiece in said direction parallel to said $x$ axis by summing up said number of stitches in said third information and the number of stitches corresponding to said second difference.

4. A numerically controlled sewing machine according to claim 3, wherein said detecting means comprises:

a. a sensor disposed at a fixed position between said loading station and said sewing station for sensing the passage of the edge nearest to said sewing instrumentalities of said workpiece and generating a sensing signal; and b. an accumulator for storing the X pulse number (N3) corresponding to the predetermined distance between said fixed position and the edge nearest to said sewing instrumentalities of said basic standard piece held by said holding means at said loading station, and for subtracting from said X pulse number (N3) the pulse number (N4) of said X pulse signals generated by said first generating means during feeding said workpiece from said loading station to said fixed position.

5. A numerically controlled sewing machine according to claim 4, wherein said compensating means comprises:

a. dividing means for equally dividing the pulse number (N2=N3−N4) detected by said detecting means into halves;

b. gate means responsive to said sensing signal for transmitting the divided pulse number (N2/2) from said dividing means to said first accumulating means; and c. means for applying to said first accumulating means a half value of the pulse number (N5) corresponding to said second difference.

6. A numerically controlled sewing machine with a loading station and a sewing station for forming an actual seam, the shape of which is similar to that of a standard seam to be formed in a standard piece, in a workpiece having an actual size close to the standard size of said standard piece and a contour similar to that of said standard piece comprising:

a. holding means for holding said workpiece in a predetermined position at said loading station spaced from said sewing station in which sewing instrumentalities are disposed;

b. driving means connected with said holding means for feeding said workpiece in the feeding direction from said loading station to said sewing station, and then intermittently transferring said workpiece relatively to said sewing instrumentalities in order to form said actual seam therein;

c. storage means for storing the feeding information including at least a pulse number (N1) corresponding to a predetermined feeding length (L2) necessary to feed said standard piece from said loading station to said sewing station, and the sewing information necessary to form said standard seam in said standard piece with said sewing instrumentalities;

d. detecting means for detecting the difference between said actual size and said standard size in said feeding direction during feeding said workpiece from said loading station to said sewing station;

e. compensating means for compensating the pulse number corresponding to the actual feeding length necessary to feed said workpiece from said loading station to said sewing station by summing up half the pulse number (N2) corresponding to said difference and said pulse number (N1); and f. means for applying to said driving means driving-signals the number of which is equal to the pulse number compensated by said compensating means, whereby said actual seam will be formed in said workpiece according to said sewing information so that the margins to seam ($Za$, $Zb$) along the opposite edges of said workpiece may be maintained equal in said feeding direction.

7. A numerically controlled sewing machine with a sewing station and a loading station spaced from the sewing station for positioning a workpiece fed from the loading station under sewing instrumentalities disposed in the sewing station and then forming in the workpiece an actual seam the shape of which is similar to that of a standard seam to be formed in a prearranged standard piece, said workpiece having an actual size close to the standard size of said standard piece and a contour similar to that of said standard piece, said sewing machine comprising:

a. a workpiece holder for holding said workpiece in a predetermined position that the reference edge remotest from said sewing instrumentalities of said workpiece is located at the first fixed position in said loading station;

b. driving means connected with said holder for feeding said workpiece from said loading station to sewing station;

c. a sensor disposed at the second fixed position between both stations for sensing the passage of the edge opposite to said reference edge of said workpiece and generating a sensing signal;

d. program means made on the basis of the standard size and the contour of said standard piece for controlling the movement of said holder;

e. said program means recording a predetermined feeding length (L2) necessary to feed said standard piece from said loading station to said sewing station, a predetermined length (L1) from the edge opposite to the reference edge of said standard piece held by said holder in said loading station to said second fixed position and the sewing information necessary to form said standard seam in said standard piece with said sewing instrumentalities;

f. means responsive to said sensing signal for calculating the difference between said predetermined length (L1) and the feeding length (L) of said workpiece from said loading station to said second fixed position;

g. means for compensating the actual feeding length of said workpiece from said loading station to said sewing station by summing up said predetermined feeding length (L2) and a half value of said difference (L1−L); and h. means for actuating said driving means so that said workpiece may be fed from said loading station by the compensated actual feeding length, whereby said actual seam will be formed in said workpiece according to said sewing information so that the margins to seam ($Za$ and $Zb$) along said reference edge and said opposite edge thereto of said workpiece may be maintained equal in said feeding direction.

* * * * *